Feb. 25, 1958 T. O. MEHAN 2,824,688
TEN KEY ACTUATOR STOP MECHANISM FOR CALCULATING MACHINES
Filed Aug. 17, 1954 7 Sheets-Sheet 1
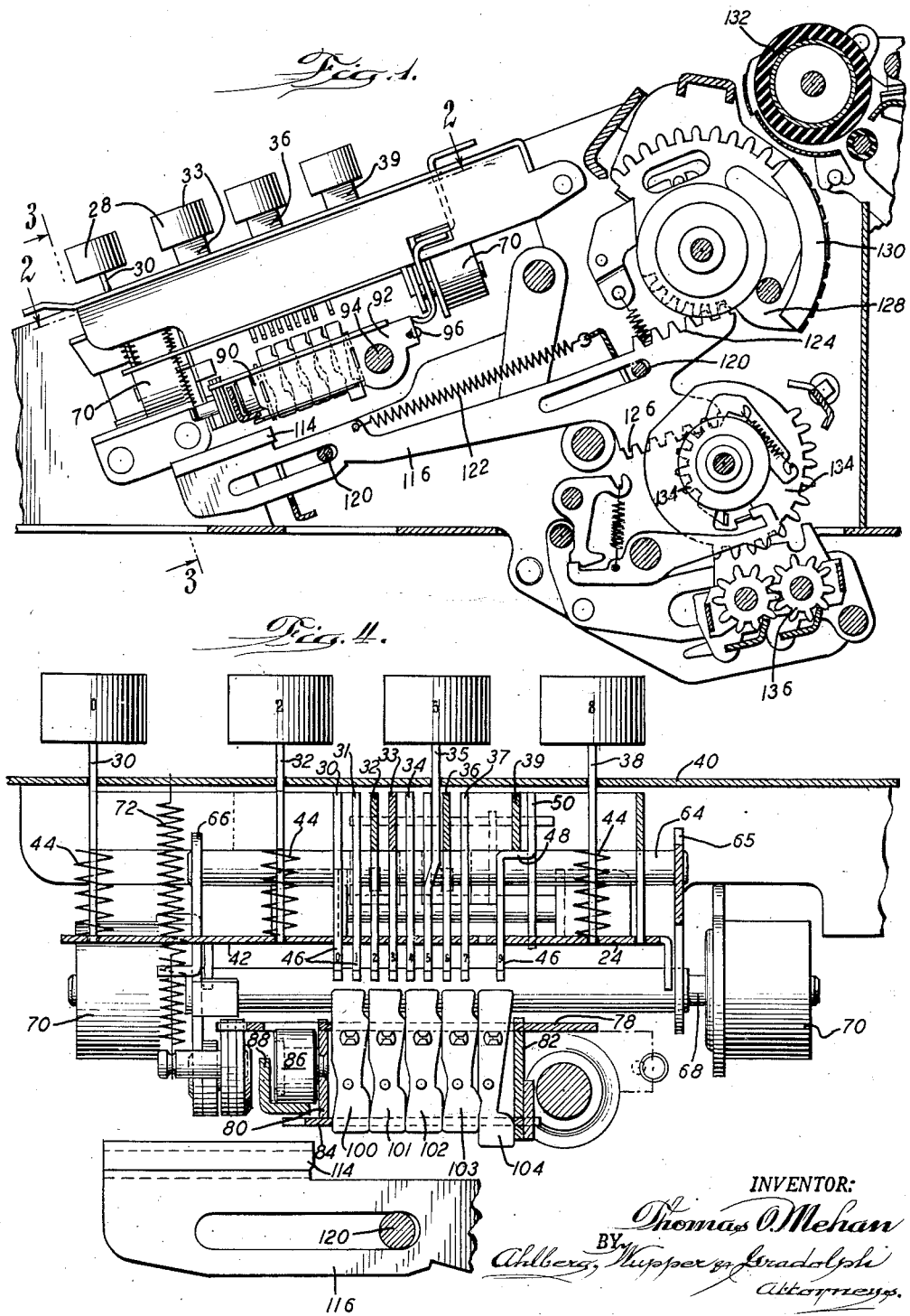
INVENTOR:
Thomas O. Mehan
BY Ahlberg, Hupper & Gradolph
Attorneys

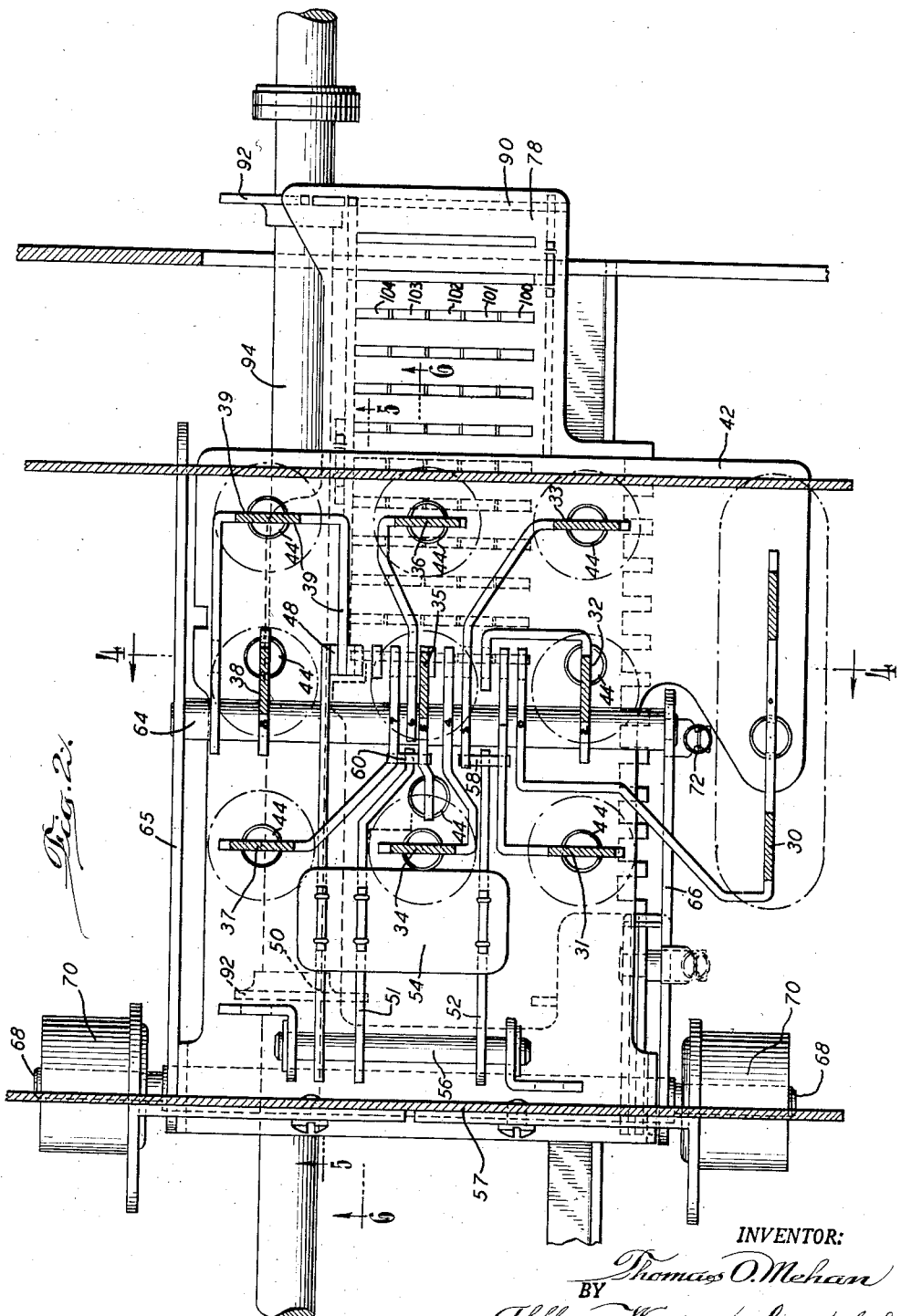

Feb. 25, 1958 T. O. MEHAN 2,824,688
TEN KEY ACTUATOR STOP MECHANISM FOR CALCULATING MACHINES
Filed Aug. 17, 1954 7 Sheets-Sheet 3
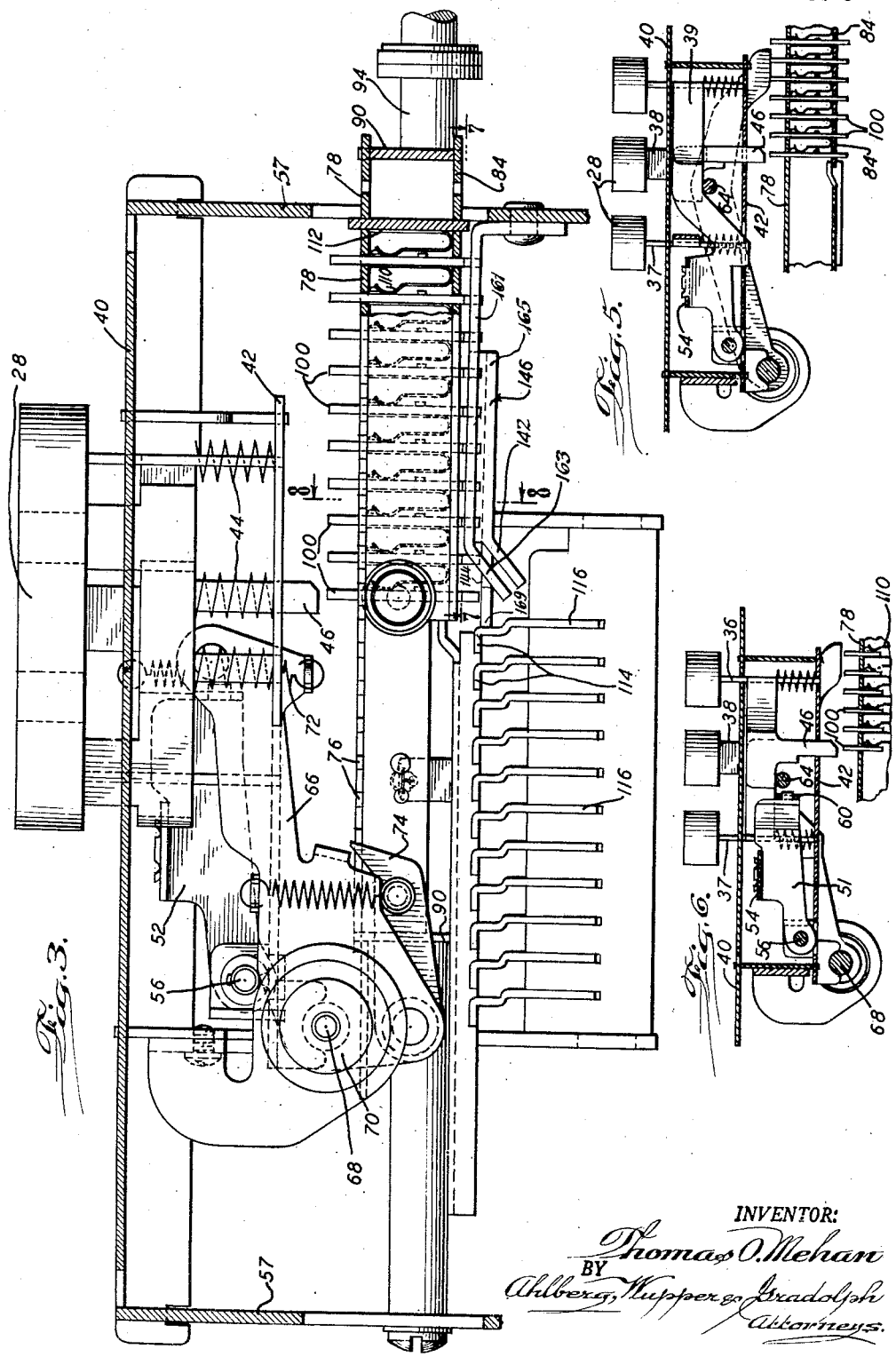
INVENTOR:
Thomas O. Mehan
BY
Ahlberg, Hupper & Bradolph
Attorneys.

Feb. 25, 1958 T. O. MEHAN 2,824,688
TEN KEY ACTUATOR STOP MECHANISM FOR CALCULATING MACHINES
Filed Aug. 17, 1954 7 Sheets-Sheet 4
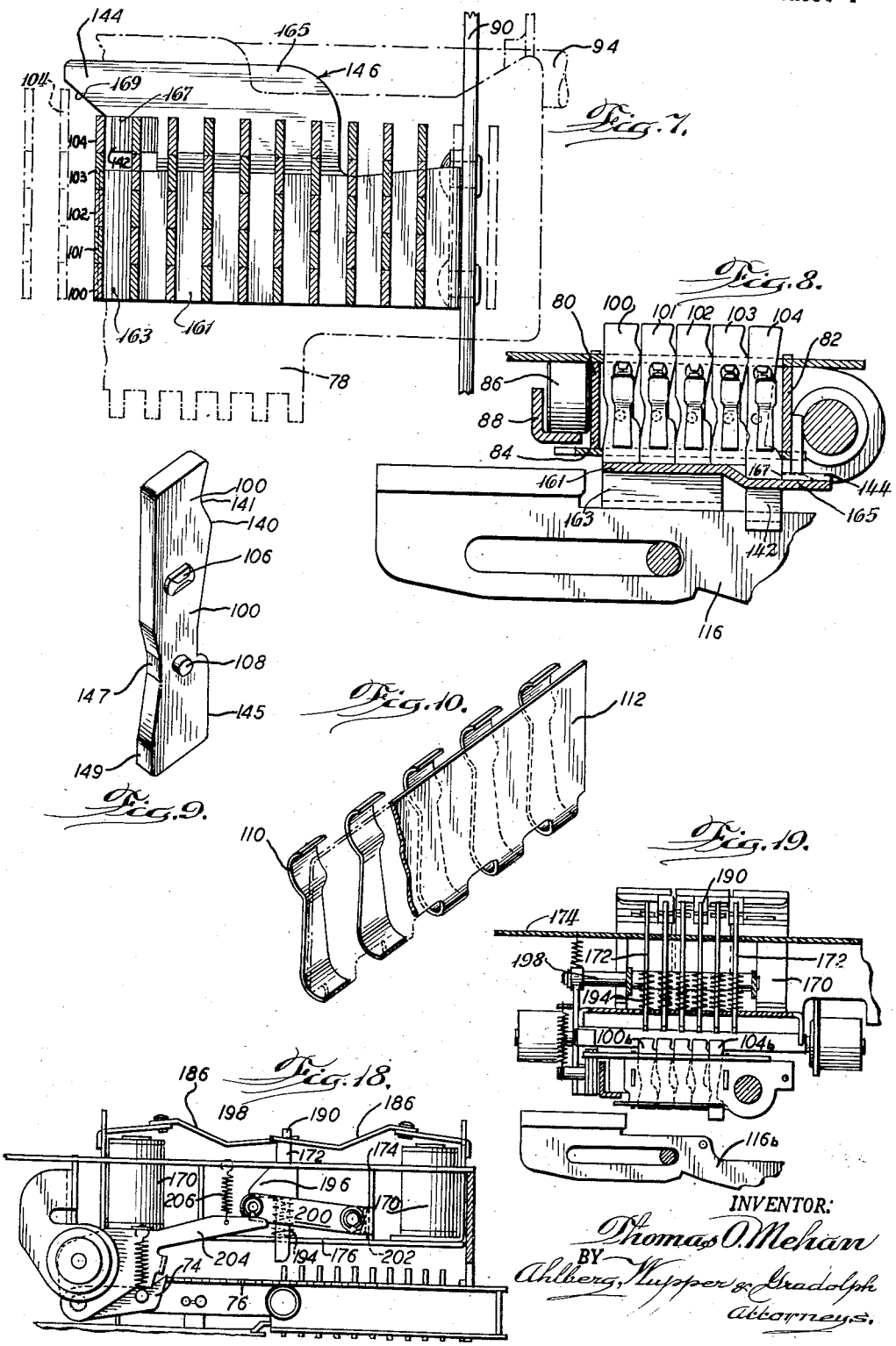

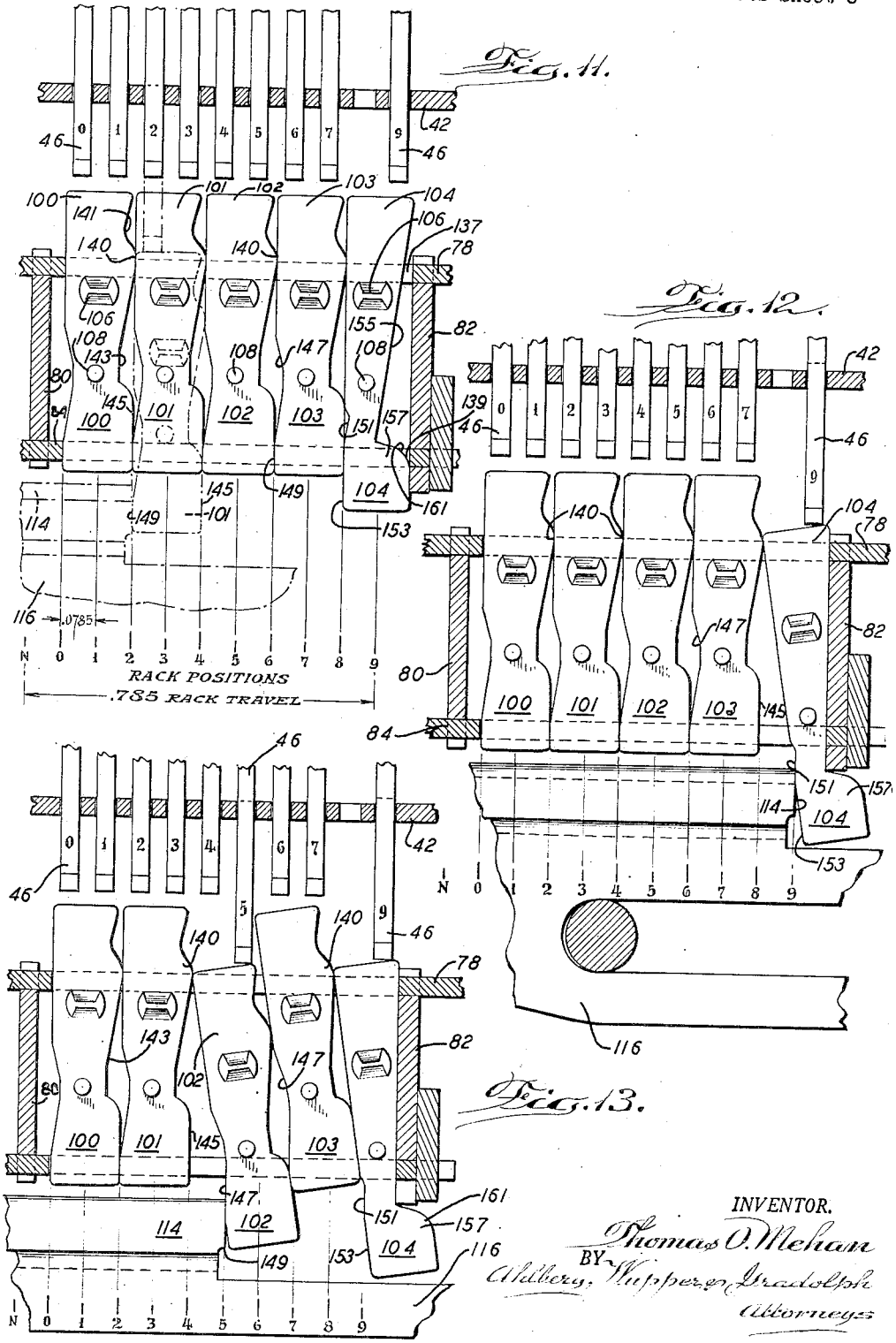

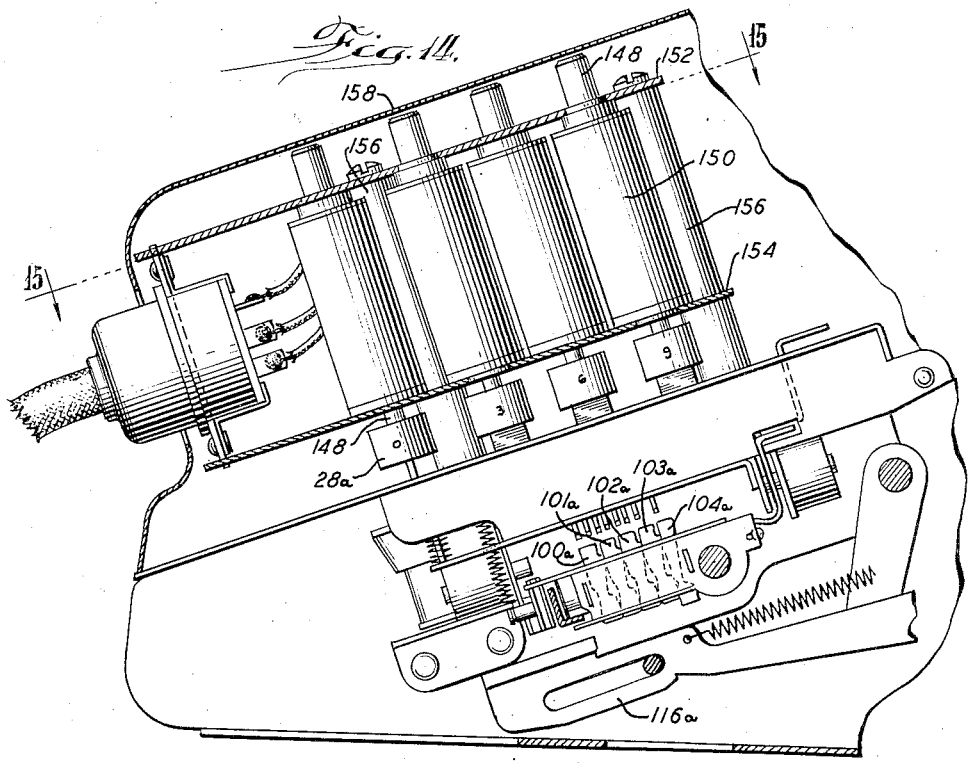
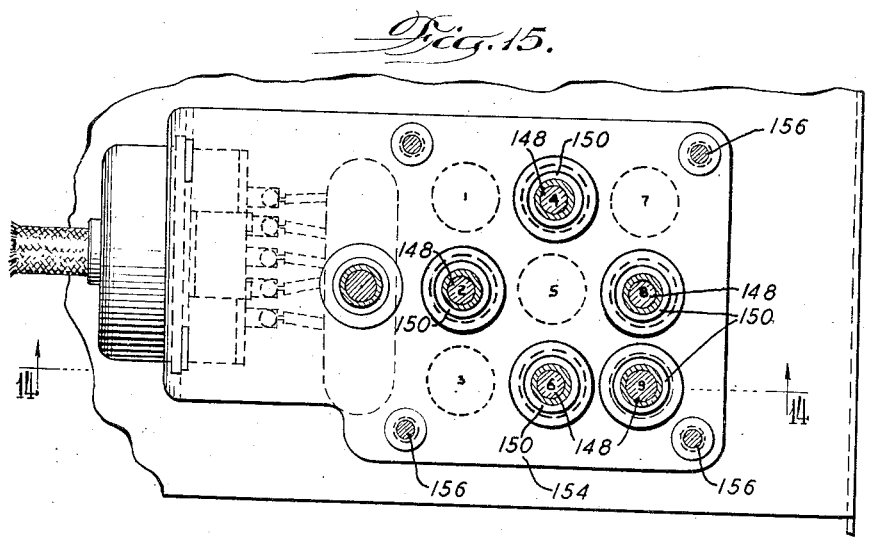

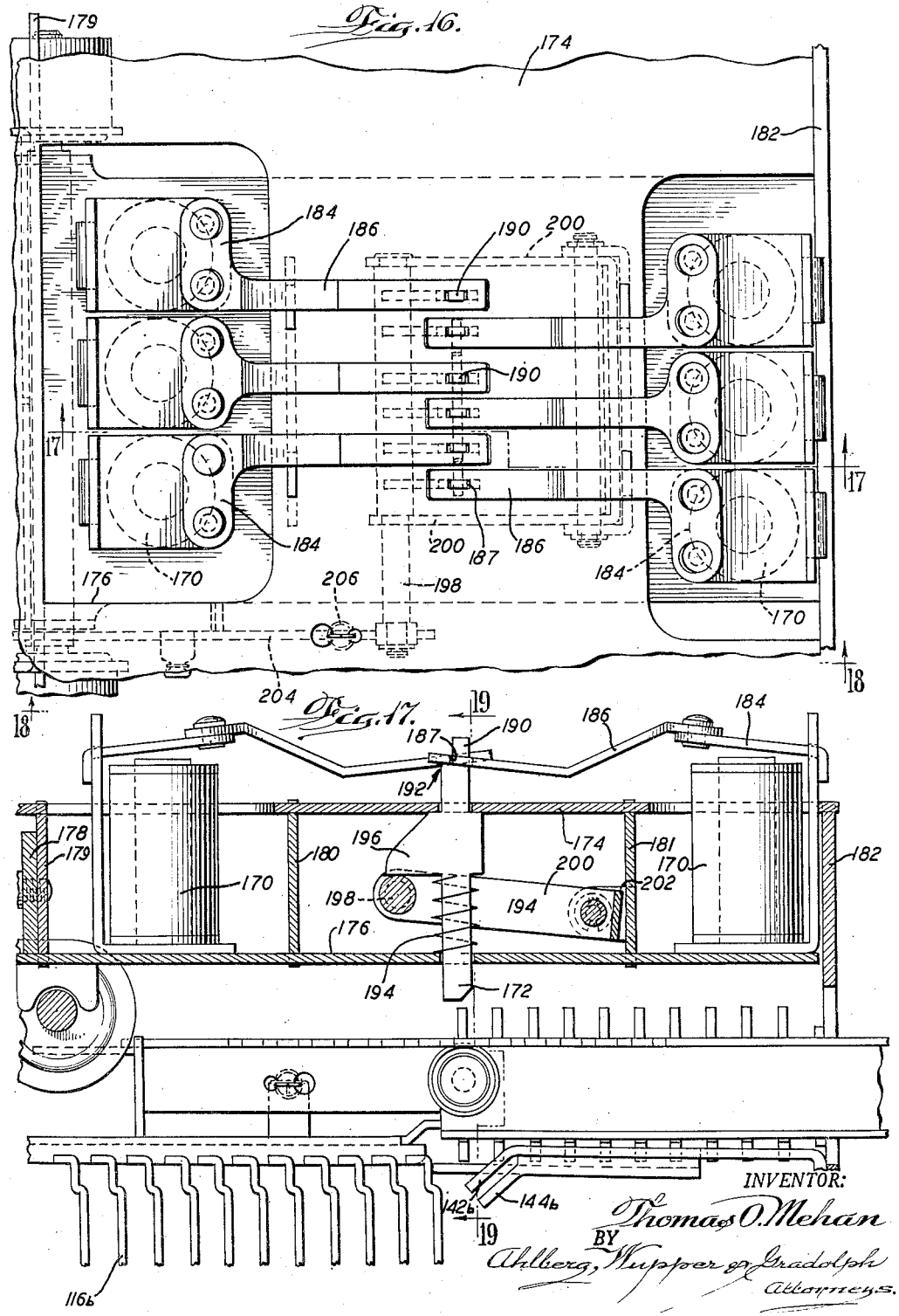

United States Patent Office 2,824,688
Patented Feb. 25, 1958

2,824,688

TEN KEY ACTUATOR STOP MECHANISM FOR CALCULATING MACHINES

Thomas O. Mehan, Park Ridge, Ill., assignor to Victor Adding Machine Co., Chicago, Ill., a corporation of Illinois Application August 17, 1954, Serial No. 450,295

3 Claims. (Cl. 235—60)

My invention relates generally to calculating machines, and more particularly to an improved stop pin assembly for ten key type machines, which provides particular advantages in machines operated by remote control. It will be understood that the principles and teachings of the invention are applicable to machines of this type which have more than ten stop positions for each denominational order, to facilitate working with data relating to a particular foreign currency or other special units of measure.

One object of the invention is to provide a calculating machine having a simplified stop pin assembly in which approximately five stop pins for each denominational order work directly with each other in various combinations to locate an actuator of simple construction in ten different numerical positions.

A more specific object is to provide for a calculating machine an improved stop pin carriage of simplified, economical construction, in which five stop pins for each denominational order work directly together, each pin serving to locate a coating actuator in two numerical positions differentially spaced in the direction of actuator movement a distance of approximately one-half the dimension of the pin in the same direction, thus providing for the use of pins of relatively large size and great strength, and making practical, in regard to the stop pin carriage, substantial reductions in the differential spacing between consecutive numerical positions of the coacting actuators.

Another object is to effect simplifications and improvements in remote controlled calculating machines through the use of novel pin assemblies of the character recited.

Other objects will become apparent from the following description, reference being had to the accompanying drawings in which Fig. 1 is a vertical sectional view showing the general arrangement of the operating parts of the calculating machine;

Fig. 2 is a generally horizontal sectional view, taken on the line 2—2 of Fig. 1, shown to an enlarged scale;

Fig. 3 is a substantially vertical sectional view, taken on the line 3—3 of Fig. 1, also to an enlarged scale;

Fig. 4 is a substantially horizontal sectional view, taken on the line 4—4 of Fig. 2;

Fig. 5 is a fragmentary detail sectional view, taken on the line 5—5 of Fig. 2;

Fig. 6 is a similar view, taken on the line 6—6 of Fig. 2;

Fig. 7 is a horizontal sectional view, taken on the line 7—7 of Fig. 3;

Fig. 8 is a transverse sectional view, taken on the line 8—8 of Fig. 3;

Fig. 9 is a perspective view of one of the stop pins;

Fig. 10 is a perspective view of one of the comb spring detents for the stop pins;

Fig. 11 is an enlarged sectional view, showing one of the rows of the stop pins and their actuators in normal position;

Fig. 12 is a view similar to Fig. 11, showing the row of stop pins with the pin for the numeral 9 operated;

Fig. 13 is a similar view, showing the stop pins set for the numeral 5;

Fig. 14 is a vertical sectional view of a portion of a modified form of the invention, taken on the line 14—14 of Fig. 15;

Fig. 15 is a transverse sectional view, taken on the line 15—15 of Fig. 14;

Fig. 16 is a plan view of the electromagnetic actuating means, with the casing removed, forming part of a second modified form of the invention;

Fig. 17 is a transverse sectional view, taken on the line 17—17 of Fig. 16;

Fig. 18 is a side elevational view, taken on the line 18—18 of Fig. 16; and

Fig. 19 is a transverse sectional view, taken on the line 19—19 of Fig. 17, drawn to a reduced scale.

Referring to Fig. 1, the machine in general comprises numeral keys 28 for the numerals "0" to "9," on stems 30 to 39 respectively, which are guided in slots formed in a top keyboard plate 40 and a lower keyboard plate 42 fixed in the machine frame. Each key stem 30 to 39 is urged upwardly to the position shown in Figs. 1 and 2 by a return spring 44. Each of the key stems, except the stems 38 and 39, has an offset and depending portion to provide a pin depressing projection 46. These projections are aligned longitudinally of the machine, as best shown in Figs. 3 and 4. The key stem 38 is merely guided in the two plates 40 and 42. Its only function is to operate the carriage escape mechanism, as will hereinafter appear.

The key stem 39 overlies a sidewardly bent portion 48 (Figs. 2 and 4) of a bail arm 50. A pin depressing projection, similar to the projections 46 and denoted by the same reference numeral, extends downwardly from the bail portion 48. The bail includes two arms 51 and 52 in addition to the arm 50. All three arms are rigidly secured together by a plate 54 and pivoted on a rod 56 suitably fixed to the plate 42 of the machine. It will be noted that key stems 31 and 33 have portions overlying a cross piece 58 secured at the free end of the bail arm 52, and the key stems 35 and 37 have portions overlying a cross piece 60 secured at the free end of bail arm 51 and, as previously stated, the key stem 39 has an offset portion overlying the sidewardly bent part 48 of the bail arm 50. Thus, when any of the keys for the odd numbered numerals is depressed, the bail 50, 51, 52 will be swung downwardly and the stop depressing portion 46 thereof will be projected downwardly to depress one of the pins.

As best shown in Fig. 2, each of the key stems 30 to 39 has a portion thereof overlying an escapement operating bail rod 64 secured to a pair of bail arms 65 and 66. The arms 65 and 66 are secured to a shaft 68 mounted in suitable noise absorbing bearing bushings 70. The bail is urged to swing upwardly by a spring 72. The bail arm 66 forms part of a well known escapement mechanism including a pawl 74 pivoted to the bail arm 66 and cooperating with rack teeth 76 (Fig. 3) formed on the forward edge of the stop carriage top plate 78.

As is customary, the stop carriage comprises a box-like construction including the top plate 78, a bottom plate 84, and two transverse walls 80 and 82 (Figs. 3 and 4). A roller 86 on the carriage rides on a rail 88 suitably mounted in the frame 57 of the machine.

The carriage also has end walls 90 which project rearwardly beyond the carriage to provide bracket portions 92 embracing a guide rod 94. As is customary, the carriage is normally urged to move to the left (Fig. 2) by a tension spring 96 (Fig. 1). The top and bottom plates 78 and 84 are provided with slots to receive four similarly shaped stop pins 100, 101, 102, and 103, and a fifth stop pin 104 for each denominational order.

The stop pins 100 to 103 are shaped as shown in Figs. 8, 9, and 11. Each pin is provided with a cam-like lug projection 106. The lug projections 106 of each denominational order of pins coact with detent portions 110 of a spring comb 112 which resiliently holds the various pins in either their normal upper positions or in operated depressed positions. A comb 112 is provided for each denominational order of pins (Fig. 3). A short cylindrical lug 108 formed on each pin below the lug 106 limits downward movement of the pin by engagement with the bottom carriage plate 84. Upward movement of each pin is limited by engagement of the lug 106 on the pin with the upper carriage plate 78. It will be noted that the stop pin 104 is longer than the stop pins 100 to 103.

The stop pins are adapted to be projected on depression of the numeral keys 28 into the path of sidewardly extending lugs 114 formed on actuators 116. As best shown in Fig. 1, the actuators 116 are guided on rods 120 and are urged to move rearwardly by springs 122. The rearward ends of the actuators have racks 124 and 126 thereon. The racks 124 engage teeth in individual gear segments 128 for moving type segments 130 into position for printing on paper tape (not shown) fed by a platen 132. The other racks 126 operate through segmental gears 134 to operate the accumulator 136.

The operating mechanism of the machine may be of any well known type, such, for example, as that shown in my Patent No. 2,486,959.

The five stop pins 100 to 104 for each denominational order are shaped and arranged in relation to each other (Figs. 9 and 11 to 13) so that each pin provides for two numerical settings of the associated actuator 116. The five pins are mounted side by side in two guide slots 137, 139 in the carriage plates 78, 84 for free sliding movement toward the carriage wall 82, that is, in the direction of movement of the actuator 116 in setting the accumulator 136 and the associated type segment 130.

A pivotal abutment 140 is formed on the upper central portion of the rear edge of each pin 100 to 103 by a first relief 141 extending from the abutment to the upper end of the pin, and a second relief 143 extending downwardly from the abutment to a straight rear edge segment 145 on the lower end of the pin. A third relief 147, cut into the forward edge of each pin 100 to 103, extends downwardly from the center of the pin to a straight segment 149 of the forward edge left on the lower end of the pin.

A relief 151 cut into the forward edge of the pin 104, starts from a point in alignment with the lower ends of the reliefs 147 in the pins 100 to 103 (when all of the pins are in raised positions as shown in Fig. 11), and extends upwardly on the pin 104 for a distance much shorter than the vertical height of the reliefs 147. A straight section 153 of the lower forward edge of the pin 104 is similar to the surfaces 149 on the pins 100 to 103, but has a length substantially twice that of the latter surfaces.

The rear edge 155 of the pin 104 is tapered progressively inward from the upper end of the pin down to a rearwardly extending toe or ledge 157 on the lower end of the pin, which is moved below the rear wall 82 of the carriage when the pin is shifted to its lower position (Fig. 12).

A cycle of operation starts with all five pins 100 to 104 of each denominational order raised to their upper positions, as shown in Fig. 11. The upper ends of the pins are aligned with each other just below the pin setting members 46. It will be noted that two pin setting members 46 are provided for each of the pins 100 to 103, starting with pin setting members for the numerals "0" and "1" for the pin 100. Only one pin setting member 46 (for the numeral "9") is provided for the pin 104. As will presently appear, no pin setting member is necessary for the numeral "8."

The abutment 140 and the lower rear edge surface 145 on each of the pins 100 to 103 slidably engages opposing sections of the forward edge of the pin next adjacent to the rear. The toe 157 on the lower end of the pin 104 rests against the lower marginal edge of the abutment formed by the carriage wall 82 to hold all the pins 100 to 104 in positions perpendicular to the carriage plates 78, 84. A downwardly curving cam surface 161 formed on the upper right corner of the toe 157 (Fig. 11) is adapted to assure smooth movement of the toe past the lower edge of the carriage wall 82 as an incident to raising movement of the pin which brings the toe into its normal abutting engagement with the carriage wall.

When all the pins are raised to their normal positions, the straight surface 153 on the lower forward edge of the pin 104 extends below the lower ends of the pins 100 to 103 a sufficient distance to engage the abutment 114 on the associated actuator 116, stopping the actuator in the number "8" position in the event it is moved rearwardly to set the accumulator and printing mechanisms.

Thus, when the numeral "8" is to be entered, the appropriate button 28 is pressed to actuate the stem 38 (Figs. 2 and 4), which operates the bail member 64 to index the carriage to the next denominational order, leaving all the pins 100 to 104 of the appropriate denominational order in their original raised positions.

To enter the number "9," the appropriate button 28 is pressed, causing the stem 39 and the attached pin actuator 46 to move the pin 104 downwardly to its lower position, as shown in Fig. 12. This downward movement of the pin 104 carries the toe 157 on the lower end of the pin below the lower edge of the carriage wall 82. Subsequent rearward movement of the actuator 116 causes the abutment 114 on the actuator to engage the recessed portion 151 of the pin 104 and swing the pin rearwardly until the stop surface formed by the inwardly sloping rear edge portion 155 of the pin engages the wall 82. This rearward swinging of the pin 104 provides for continued rearward movement of the actuator 116 past its "8" position to the position corresponding to the next highest numerical setting. Thus, the pin 104 alone serves to locate the actuator 116 in the "9" position as well as in the "8" position.

Settings for the remaining even numerals, that is, "0," "2," "4," and "6," for each denominational order, are provided by depressing the respective stop pins 100 to 103, leaving the pin 104 in its normal raised position. A typical setting for one of these even numbers is shown in phantom in Fig. 11. The pin 101 is moved to its lower position by the overlying actuator 46 for the numeral "2." This carries the vertical surface 149 on the lower forward edge of the pin into position to be engaged by the actuator abutment 114. The opposite side edge 145 of the depressed pin remains in sliding engagement with forward edge surface of the adjacent pin 102, which is supported through the pins 103 and 104 against rearward swinging movement. The toe 157 of the pin 104 remains in engagement with the carriage wall 82. As a result rearward movement of the actuator 116 is terminated at the proper position for entering the numeral "2."

The width of the lower end of each pin 100 to 103 is equal to twice the linear movement of the actuator 116 necessary to differentiate between two consecutive numbers. As indicated in Fig. 11, this movement for the machine illustrated is .0785", for a particular machine in which the invention was embodied.

Settings for the remaining odd numbers, that is, "1," "3," "5," and "7," are provided by depressing the respective pins 100 to 103 and simultaneously depressing the pin 104. As shown in Fig. 13, a typical setting is made by depressing the pin 102 by the overlying pin setter 46 for the number "5." As indicated previously, the stem 35 for the number "5" (Figs. 2 and 4), like the actuating stems for the other odd numerals "1," "3," and "7," overlies the actuator for the pin setter 46 for the numeral "9," so that depressing of the stem 35 produces a simultaneous downward shifting of the pins 102 and 104. Consequently, the toe 157 on the pin 104 is moved below the carriage wall 82 and the lower end of the relief 147 on the pin 102 is carried into the path of the actuator abutment 114.

Subsequent rearward movement of the associated actuator 116 causes the abutment 114 to engage the pin 102. This pin, together with the pins 103 and 104, is swung to the rear to substantially the same degree as the pin 104 alone swings for entering the number "9," as previously described. Thus, all three pins 102, 103, and 104 work together to provide a proper setting for the number "5."

In general, the settings for the pins 100 to 104, which provide respectively for entry of the even numerals "0" through "8," are modified for entering the odd numbers "1" through "9," by depressing the pin 104. The operating mechanism used in setting the pins provides, as previously explained, for depressing the pin 104 each time an odd number is to be entered.

This improved and simplified arrangement of five stop pins for each denominational order, in which each pin provides for two numerical settings for a coacting actuator, affords many advantages as to simplicity of design, economy of manufacture, and functional utility. The individual stop pins may have considerable size and strength. Moreover, the way is cleared for using shorter increments of movement of the coacting actuators 116 to differentiate between consecutive numerical settings of each denominational order, if it is desired to make a machine of small over-all dimensions.

Near the end of the machine cycle, the stop pin carriage is restored to the right (Figs. 2 and 3) by the usual mechanism, it being advanced past the position shown and then returned. As the carriage moves to the right, any stop pins which have been set will be returned to their normal upper positions by cam members on a generally horizontal cam plate 146 fixed to the frame 57 and lying just below the carriage.

As shown in Figs. 3, 7, and 8, a flat elongated section 161 of the cam plate 146 immediately underlies the horizontal paths traversed by the lower ends of the pins 100 to 103. The left marginal edge 163 of the plate section 161 (Figs. 3 and 7) is turned downwardly at an angle to engage the lower ends of previously set pins 100 to 103 of each denominational order and return these pins to their upper position as the stop pin carriage is retracted. A lateral projection 165 of considerable size on the rear edge of the plate section 161 is offset downwardly (Fig. 8) to just clear the longer stop pins 104 when the latter are in normal position. The projection 165 includes a finger 144 inclined upwardly at a small angle to the main portion of the projection and extending to the left (Fig. 7) beyond the inclined plate edge 163. A straight forward edge 167 of the finger 144 lies just below the forward vertical surface of the carriage rear wall 82.

A cam surface 169 on the finger 144 inclined rearwardly from the finger edge 167 to the outer end of the finger is disposed somewhat above the main portion of the lateral projection 165 to engage the lower rear edge of any pin 104 which has been previously set and moved rearwardly, as shown in Figs. 12 and 13. Any pin 104 so engaged by the cam 169 is swung forwardly to its normal vertical position, thus straightening all other rearwardly displaced pins (if any) of the same denominational order before they reach the inclined resetting edge 163.

The pins 104 straightened by the finger 144 are returned to their upper positions, as retraction of the carriage continues, by a downwardly inclined cam member 142 integral with the projection 165 at the forward edge of the finger.

The invention heretofore described has peculiar advantages when employed in an electrically controlled calculating machine such as shown, for example, in the patent to Mehan et al., No. 2,497,784.

Such modifications of the invention are shown in Figs. 14 to 17. Structural elements in these figures, similar to those in the form of the invention just described, are denoted by the same reference numerals with the addition of the suffix "a."

In Figs. 14 and 15, keys 28a for the numerals 0, 2, 4, 6, 8, and 9, are depressible by the plungers 148 of six solenoids 150. These solenoids are mounted in a suitable frame comprising an upper plate 152 and a lower plate 154 suitably spaced and supported by posts 156, the solenoids being protected against dust and manipulation by a top casing plate 158. In other respects the stop pin setting mechanism may be identical with that shown in Figs. 1 to 13.

Any one of the even numbers 0, 2, 4, 6, or 8, is set into the machine by energizing the solenoid 150 positioned to actuate the key 28a for that number. As previously explained, actuation of the key for number "8" serves merely to index the carriage to the next denominational order, the normal setting of the pin 104a providing for entry of this number into the machine.

The number "9" is entered by energizing the solenoid 150 for actuation of the number "9" key 28a. Other odd numbers are entered by energizing the solenoid 150 for number "9" key and simultaneously energizing the solenoid for actuating the key for the next lower even number. (Zero is considered to be the lowest even number.) Thus, the number "1" would be entered by energizing the zero and nine solenoids 150.

Thus, by the use of only six solenoids 150, the carriage may be indexed from one denominational order to the next and the stop pins 100a to 104a may be set selectively to arrest the actuators in any one of ten positions.

Referring again to prior Patent No. 2,497,784, it will be evident that it is necessary merely to connect the solenoid 150 for the "9" numeral key in parallel with the circuits for the solenoids which actuate the 1, 3, 5, and 7 numeral keys to effect the operation described above.

The invention may also be embodied in a still simpler form, as shown in Figs. 16 to 19. In the main, the parts of the stop pin setup mechanism are similar to those in the previously described embodiments. Therefore, reference characters corresponding to those parts which have previously been described have been applied, with the addition of the suffix "b" to the reference characters of corresponding parts in Figs. 16 to 19.

As best shown in Figs. 16 and 17, there are provided six electromagnets 170 arranged in two parallel rows opposite a row of six pin setting stems 172. Five of the six stems are aligned with the five stop pins 100b to 104b of the carriage (Fig. 19). The stems 172 are guided in suitable slots formed in an upper frame plate 174 and a lower frame plate 176, the latter also serving as a support for the electromagnets 170. The frame plates 174 and 176 are suitably assembled into a frame rigid in the machine, by a plurality of vertical plates 178, 179, 180, 181, and 182. Six armatures 184 for the respective electromagnets 170 have extension arms 186 which have slots 187 for the reception of reduced width upper end portions 190 formed at the upper ends of the stems 172. Each of the armature extensions 186 rests upon a shoulder 192 forming a part of its stem 172 at the base of the projection 190 to depress the stem when the electromagnet for the attached armature 184 is energized.

The stems 172 are biased to their upward positions by compression coil springs 194. Each of the stems has a sidewardly projecting shoulder 196 overlying a bail rod 198 (Fig. 17). Support arms 200 for the rod 198 are suitably pivoted on brackets 202 attached to the vertical frame plate 181 (Figs. 17 and 18). The forward end of the bail rod 198 overlies the rightward end of an escapement actuating arm 204 (Fig. 18) which corresponds in function to the arm 66 of the previously described embodiment (Fig. 3). The arm 204 is biased to swing upwardly by a tension spring 206 and cooperates with the pawl 74 and rack 76 to permit the pin carriage to move leftward one step so as to be aligned with the next highest denominational order upon energization of any of the electromagnets 170.

Some calculating machines built to handle special data, such as, for example, the British monetary system, are provided with more than ten stop positions for at least a portion of the available denominational orders. It will readily be appreciated that the present invention can be incorporated into special machines of this type. Except for a single pin 104 (Figs. 11 to 13) all the stop pins of a given denominational order are identical. Additional pins of the same common design can be provided in any denominational order as desired, each pin making available two additional stop positions. Only one pin setting actuator is required for each pin.

In the foregoing description and in the following claims, the terms "forward," "rearward," and other directional terms are used purely in the relative sense rather than in the absolute sense, because the invention may be employed irrespective of the absolute direction of the movement of the parts.

While I have shown and described preferred embodiments of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a business machine, the combination of a plurality of movable actuators for transferring in the machine consecutive denominational orders of successive multiple digit numbers, a single stop abutment on each actuator, means for moving said respective actuators in a rearward number transferring direction, means coacting with each actuator to constrain rearward movement thereof to a predetermined path thus defining a predetermined path for rearward movement of the single abutment on the actuator, a stop pin assembly for precluding movement of the individual actuators rearwardly of ten differentially spaced numerical positions, said pin assembly incuding for each actuator a coacting set of five elongated stop pins disposed generally perpendicularly to said predetermined path of actuator stop abutment movement and arranged in slidable side by side engagement with each other in a single row extending from front to rear generally parallel to said predetermined path of actuator stop abutment movement, means releasably supporting the five respective pins of each row in normal longitudinal positions, the rearmost pin of each row being dimensioned longitudinally with respect to said pin supporting means to protrude when supported by the latter in normal longitudinal position into said predetermined path of movement of a coacting actuator abutment; the four pins of each row located forwardly of said rearmost pin therein being dimensioned with respect to said pin supporting means to clear, when supported by the latter in normal longitudinal positions, said predetermined path of movement of a coacting actuator abutment; the end portion adjacent the coacting actuator abutment movement path of each stop pin forwardly of the rearmost stop pin in the respective rows being free to slidably engage the pin next to the rear and having an effective width along the path of coacting actuator abutment movement substantially equal to twice the predetermined spacing between successive numerical settings for the coacting actuator abutment, guide means coacting with the five stop pins of each row to constrain the pins for limited movement rearwardly, said guide means for each row of pins including abutment means located at the rear of the row, said rearmost stop pin of each row defining a ledge thereon facing the adjacent abutment means and located longitudinally along the pin to engage the abutment means when the rearmost pin is in normal longitudinal position to hold the rearmost pin and the four pins forwardly thereof against rearward movement, the longitudinal location of said ledge on each rearmost pin being such that the ledge clears the adjacent abutment means upon shifting of the pin longitudinally away from normal position into a set position extending farther across the path of movement of the coacting actuator abutment thus freeing the pin to be moved rearwardly, means defining a stop surface on each rearmost pin oriented in relation to the adjacent abutment means to limit to a single predetermined space between adjacent numerical positions of the coacting actuator rearward movement of the pin after effective disengagement of the said ledge surface thereon from the abutment means, and means for longitudinally moving the five stop pins of each row from normal positions individually toward the path of movement of the coacting actuator abutment to set positions in which the respective pins project into said last mentioned path of movement and the rearmost pin of the row is freed for rearward movement limited by engagement of said stop surface thereon with said coacting abutment means whereby the rearmost pin depending on the setting thereof can directly preclude movement of an actuator abutment rearwardly of either of two spaced numerical positions and each pin in the row forwardly of the rearmost pin can upon being set longitudinally into the path of movement of a coacting actuator abutment preclude movement of the abutment rearwardly of either of two spaced numerical positions depending on the setting of the pin and the setting of the rearmost pin.

2. In a ten key business machine, the combination of ten keys for setting into the machine digital numbers from zero to nine inclusive, a plurality of movable actuators for transferring in the machine consecutive denominational orders of successive multiple digit numbers set into the machine by said keys, a single stop abutment on each actuator, means for moving said respective actuators in a rearward number transferring direction, means coacting with said actuators to constrain rearward movement of said abutments thereon to predetermined generally parallel paths, a shiftable stop pin carriage, means supporting said carriage for translation transverse to said parallel paths of actuator abutment movement, said carriage including for each actuator a coacting set of five elongated stop pins disposed generally perpendicularly to said predetermined paths of actuator stop abutment movement and arranged in slidable side by side engagement with each other in a single row extending from front to rear generally parallel to said predetermined paths of actuator stop abutment movement, means releasably supporting the five respective pins of each row in a normal longitudinal position in the carriage, the rearmost pin of each row being dimensioned longitudinally with respect to said pin supporting means to protrude when supported by the latter in normal longitudinal position into the predetermined path of movement of a coacting actuator abutment; the four pins of each row located forwardly of said rearmost pin therein being dimensioned with respect to said pin supporting means to clear, when supported by the latter in normal longitudinal positions, said predetermined path of movement of a coacting actuator abutment and to extend upon longitudinal setting of the pins into said last mentioned path of movement; the end portion adjacent the coacting actuator abutment movement path of each stop pin forwardly of the rearmost stop pin in the respective rows being free to slidably engage the pin next to the rear and having an effective width along the path of coacting actuator abutment movement substantially equal to twice the predetermined spacing between successive numerical settings for the actuator abutment, guide means coacting with the five stop pins of each row to constrain the pins for limited movement rearwardly, said guide means for each row of pins including abutment means located at the rear of the row, said rearmost stop pin of each row defining a ledge thereon facing the adjacent abutment means and located longitudinally along the pin to engage the abutment means when the rearmost pin is in normal longitudinal position to hold the rearmost pin and the four pins forwardly thereof against rearward movement, the longitudinal location of said ledge on each rearmost pin being such that the ledge clears the adjacent abutment means upon shifting of the pin longitudinally away from normal position into a set position extending farther across the path of movement of the coacting actuator abutment thus freeing the pin to be moved rearwardly, means defining a stop surface on each rearmost pin oriented in relation to the adjacent abutment means to limit to a single predetermined space between adjacent numerical positions of the coacting actuator rearward movement of the pin after effective disengagement of the said ledge surface thereon from the abutment means, indexing means coacting with said carriage support means and extending between said carriage and said respective keys to index the carriage across said paths of abutment movement in response to actuation of any one of the keys, first pin setting means mounted to register with the rearmost pin in successive rows upon indexing of said carriage and interconnected with said keys for odd numbers from one to nine inclusive to set the registering rearmost pin in response to actuation of any one of said odd numbered keys, second pin setting means extending from said keys for odd numbers one to seven inclusive into registry with the four forward pins in the row in registry with said first pin setting means to set the four last mentioned pins respectively from front to rear upon operation of the respective odd number keys from one to seven, and third pin setting means extending from said keys for even numbers zero to six inclusive to said four last mentioned pins to set the latter respectively from front to rear upon actuation of said even numbered keys zero to six respectively.

3. In a simplified business machine adapted to be operated electrically by remote control, the combination of a plurality of movable actuators for transferring in the machine consecutive denominational orders of successive multiple digit numbers, a single stop abutment on each actuator, means for moving said respective actuators in a rearward number transferring direction, means coacting with said actuators to constrain rearward movement of said abutments thereon to predetermined generally parallel paths, a shiftable stop pin carriage, means supporting said carriage for translation transverse to said parallel paths of actuator abutment movement, said carriage including for each actuator a coacting set of five elongated stop pins disposed generally perpendicularly to said predetermined paths of actuator stop abutment movement and arranged in slidable side by side engagement with each other in a single row extending from front to rear generally parallel to said predetermined paths of actuator stop abutment movement, means releasably supporting the five respective pins of each row in a normal longitudinal position in the carriage, the rearmost pin of each row being dimensioned longitudinally with respect to said pin supporting means to protrude when supported by the latter in normal longitudinal position into the predetermined path of movement of a coacting actuator abutment; the four pins of each row located forwardly of said rearmost pin therein being dimensioned with respect to said pin supporting means to clear, when supported by the latter in normal longitudinal positions, said predetermined path of movement of a coacting actuator element; the end portion adjacent the coacting actuator abutment movement path of each stop pin forwardly of the rearmost stop pin in the respective rows being free to slidably engage the pin next to the rear and having an effective width along the path of coacting actuator abutment movement substantially equal to twice the predetermined spacing between successive numerical settings for the actuator abutment, guide means coacting with the five stop pins of each row to constrain the pins for limited movement rearwardly, said guide means for each row of pins including abutment means located at the rear of the row, said rearmost stop pin of each row defining a ledge thereon facing the adjacent abutment means and located longitudinally along the pin to engage the abutment means when the rearmost pin is in normal longitudinal position to hold the rearmost pin and the four pins forwardly thereof against rearward movement, the longitudinal location of said ledge on each rearmost pin being such that the ledge clears the adjacent abutment means upon shifting of the pin longitudinally away from normal position into a set position extending farther across the path of movement of the coacting actuator abutment thus freeing the pin to be moved rearwardly, means defining a stop surface on each rearmost pin oriented in relation to the adjacent abutment means to limit to a single predetermined space between adjacent numerical positions of the coacting actuator rearward movement of the pin after effective disengagement of said ledge surface thereon from the abutment means, six actuating solenoids adapted for independent operation by remote control, indexing means coacting with said carriage support means and operatively connected between said carriage and said respective solenoids to index the carriage across said paths of actuator abutment movement in response to operation of any one of the solenoids, five independently operable pin setters mounted to register respectively with the five pins in each successive row upon indexing of said carriage, and means connecting five of said solenoids to said respective pin setters to actuate the latter selectively to shift the respective pins registering therewith into set positions extending into the movement path of the coacting actuator abutment.

References Cited in the file of this patent

UNITED STATES PATENTS

| | | |
|---|---|---|
| 1,178,073 | Hopkins | Apr. 4, 1916 |
| 1,323,475 | Horton | Dec. 2, 1919 |
| 2,044,121 | Lasker | June 16, 1936 |
| 2,293,127 | Fishack et al. | Aug. 18, 1942 |
| 2,497,784 | Mehan et al. | Feb. 14, 1950 |